UNITED STATES PATENT OFFICE.

WILLIAM L. WILLING AND CAUGHY B. WILLING, OF BELLEVUE, OHIO.

COMPOSITION FOR LITHIC BUILDING MATERIAL.

1,226,292.  Specification of Letters Patent.  Patented May 15, 1917.

No Drawing.  Application filed June 30, 1916.  Serial No. 106,939.

*To all whom it may concern:*

Be it known that we, WILLIAM L. WILLING and CAUGHY B. WILLING, citizens of the United States, residing at Bellevue, in the county of Huron, and State of Ohio, have invented a certain new and useful Improvement in Compositions for Lithic Building Material, of which the following is a full, clear, and exact description.

The object of this invention is to provide a building material which shall have the durable, fire-proof and other characteristics of usual concrete, and shall also be readily workable with a saw, boring tools, etc., very much after the manner of lumber. Such material, molded into slabs similar to lumber, is very useful, as it may be formed into desired shapes by a carpenter, may be readily secured in position in a structure, and may be used in various places where it is impracticable to pour concrete.

We have discovered that a desirable material for this purpose may be made by a mixture of Portland cement and what is known as granulated slag,—that is, the vesicular, pumice-like substance resulting from spraying water onto molten slag. This granulated slag, so called, has very different characteristics from ground or pulverized slag, and consists of small, very light, irregular, porous particles, resembling pieces of fine sponge but of a friable nature.

In making our concrete lumber we mix the pumiciform material described with Portland cement, with or without other materials, and in proportions which may be varied considerably, according to the requirements. We have produced satisfactory results with one part of Portland cement and three parts of porous granulated slag, and satisfactory results with one part of Portland cement and seven parts of such granulated slag. Where only Portland cement is employed with the porous granulated slag, we prefer proportions intermediate of these two.

The porous granulated slag and cement may be mixed together with a sufficient quantity of water to enable the composition to be readily molded into the desired shape, and, in such case, we prefer to use a considerably less quantity of water than would enable the material to be poured. After molding it is dried, either by artificial or natural heat, in the latter case several days being preferably employed.

We have found that by employing some quantity of crushed slag sand with the mixture of Portland cement and porous granulated slag, we are able to pour the mixture when it has a sufficient quantity of water. In that case it may be made into slabs by pouring and drying, or may be poured in place if desired. When it is desired to use the pouring method, we prefer proportions of substantially one part Portland cement, two parts crushed slag sand, and four parts porous granulated slag. Whichever method is used, a sufficient quantity of the porous granulated slag is employed to give the composition the artificial lumber characteristics stated.

We have found that the composition described may be readily made into slabs, planks or building members, which can be sawed and have holes drilled into them, and used after the general manner of lumber. Our slabs have a weight commensurate with that of oak; they are fire-proof, durable and strong, and they present a surface adapted to receive plaster. Having these and other desirable characteristics, they are adapted for a great variety of uses in building construction. These planks, which we have named "concrete lumber", may be kept in stock in convenient sizes, ready for use wherever desired.

Having thus described our invention, what we claim is:

1. A substance for use as a building material consisting of porous granulated slag, crushed slag sand, and cement, in about the proportions specified.

2. A composition of matter comprising a mixture of porous granulated slag and cement in about the proportions specified.

3. A building material in the form of concrete lumber comprising planks or slabs made by mixing together Portland cement and porous granulated slag in about the proportions specified as preferred, the composition being moistened, molded to shape and then dried.

In testimony whereof we hereunto affix our signatures.

WILLIAM L. WILLING.
CAUGHY B. WILLING.